United States Patent
Nakanishi et al.

(10) Patent No.: US 6,771,394 B1
(45) Date of Patent: Aug. 3, 2004

(54) IMAGE SCANNING APPARATUS AND IMAGE SCANNING METHOD

(75) Inventors: Nobuo Nakanishi, Kanagawa (JP); Hajime Yamamoto, Kanagawa (JP); Satoshi Segawa, Kanagawa (JP); Tomoaki Fukano, Tokyo (JP); Masato Iwakawa, Tokyo (JP)

(73) Assignee: NEC Corporation, Tokyo (JP)

( * ) Notice: Subject to any disclaimer, the term of this patent is extended or adjusted under 35 U.S.C. 154(b) by 551 days.

(21) Appl. No.: 09/612,268

(22) Filed: Jul. 7, 2000

(30) Foreign Application Priority Data

Jul. 12, 1999 (JP) .......................................... 11-197788

(51) Int. Cl.$^7$ ................................................. H04N 1/04
(52) U.S. Cl. ....................... 358/474; 358/475; 358/494; 358/497; 250/208.1; 250/234
(58) Field of Search ................................ 358/474, 475, 358/494, 497; 250/208.1, 234, 235, 236

(56) References Cited

U.S. PATENT DOCUMENTS

| | | | | |
|---|---|---|---|---|
| 4,063,811 A | * | 12/1977 | Seino et al. | ................. 399/128 |
| 4,422,100 A | * | 12/1983 | DuVall et al. | ............... 358/497 |
| 5,760,925 A | * | 6/1998 | Saund et al. | ................. 358/497 |
| 5,995,245 A | * | 11/1999 | Moro | ......................... 358/474 |

FOREIGN PATENT DOCUMENTS

| | | |
|---|---|---|
| JP | 3-136569 | 6/1991 |
| JP | 4-53370 A | 5/1992 |
| JP | 07092408 | * 9/1993 |
| JP | 7-177318 | 7/1995 |
| JP | 7-193682 | 7/1995 |
| JP | 8-9102 | 1/1996 |
| JP | 8-223363 | 8/1996 |
| JP | 8-265472 A | 10/1996 |
| JP | 8-315122 | 11/1996 |
| JP | 9-261419 | 10/1997 |
| JP | 9-261419 A | 10/1997 |
| JP | 10-290327 A | 10/1998 |
| JP | 10-336404 | 12/1998 |
| JP | 11-55462 A | 2/1999 |

* cited by examiner

*Primary Examiner*—Edward Coles
*Assistant Examiner*—Heather D Gibbs
(74) *Attorney, Agent, or Firm*—Sughrue Mion, PLLC (57) ABSTRACT

The present invention provides an image scanning apparatus 100 including a stand block 1 having a support arm 3, a scan type illumination device 5 for applying a slit-shaped light beam 8 onto a surface of a manuscript 2, and a manuscript image scanning device 4 mounted on the support arm 3 for receiving the slit-shaped light beam 8 reflected from the surface of the manuscript 2 and having a manuscript image. The scan type illumination device 5 applies the slit-shaped light beam 8 in a direction 11 vertical to the longitudinal direction of the slit-shaped light beam 8. The manuscript image scanning device includes a manuscript image input block 13 and a light detecting device 14 for receiving the reflected light 8' output from the manuscript image input block 13. The manuscript image input block 13, in synchronization with the scan operation of the scan type illumination device 5, introduces the reflected light 8' into a predetermined position of the light detecting device 14.

22 Claims, 6 Drawing Sheets

IMAGE SCANNING APPARATUS AND IMAGE SCANNING METHOD

BACKGROUND OF THE INVENTION

1. Field of the Invention

The present invention relates to an image scanning apparatus and an image scanning method and in particular, to an image scanning apparatus and an image scanning method using a sub scan mechanism for combining a linear partial image obtained by a linear image sensor, thus inputting a two-dimensional manuscript image.

2. Description of the Related Art

Conventionally, various types of image scanning apparatus have been suggested. Among them, an image scanner apparatus uses a linear image sensor as a pickup device in the image input mechanism and a sub scan mechanism for combining partial images obtained by the linear image sensor for inputting a two-dimensional manuscript.

The image scanner apparatus can be divided into an indirect type image scanner apparatus in which the manuscript surface is apart from the image input mechanism supported by a stand or the like and a flat bed type image scanner in which the manuscript surface is placed downward on the image input mechanism unitizing the manuscript surface and the image input mechanism.

In the conventional indirect type image scanner apparatus, the brightness of the manuscript surface depends on the natural light or the ordinary illumination on the ceiling and no particular illumination is used for the image scanner or an auxiliary illumination is used for illuminating the entire manuscript surface.

In the indirect image scanner not using any auxiliary illumination, the brightness of the manuscript surface may not be sufficient, which relatively increases the noise level of the image sensor output, adversely affecting the image read in. Moreover, in the indirect image scanner using an auxiliary illumination, the auxiliary illumination may dazzle eyes of a user and cause an unpleasant heat.

Such an image scanning apparatus or image scanning method is disclosed, for example, in Japanese Patent Publication 3-136569 [1], in which a manuscript is placed around a cylindrical member and the manuscript is scanned by a CCD line sensor in the main scan direction while the sub scan is performed by rotation of the cylindrical member, so as to store an image of the manuscript. This image scanning apparatus cannot realize a high-speed and stable image reading.

Moreover, Japanese Patent Publication 7-177318 [2] discloses an image scanning apparatus in which a unitary block of a light source and a line image sensor is detachably fixed to a slit provided on a manuscript table and displaced manually, so as to enable to read a transient manuscript as well. However, since the unit is displaced manually, it is difficult to obtain a high-speed and stable image reading.

Furthermore, Japanese Patent Publication 8-223363 [3] discloses an image scanning apparatus in which three color lights are successively applied by a light emitting device for each line, so as to scan the entire manuscript surface to read an image. This image scanning apparatus, the light emitting device is displaced by a motor and a chain for scanning. Accordingly, it is difficult to perform a high-speed and stable image reading.

Furthermore, Japanese Patent Publication 8-315122 [4] discloses a transparent type image scanning apparatus, in which a mesh gradation is inserted between a manuscript and a light source so as to correct a transmitting light amount in the direction of a line image sensor. However, document [4] has no disclosure on the light amount adjustment in a reflection type image scanning apparatus.

On the other hand, Japanese Patent Publication 9-261419 [5] discloses a reflection type image scanning apparatus in which a slit-shaped light emitted from a light source is used to scan a manuscript by displacing a reflection mirror and a line image sensor is displaced in synchronization with the slit-shaped light beam scan. However, since the line image sensor moves a great distance as a parallel displacement, a complicated synchronization mechanism is required. Moreover, the parallel displacement of the image sensor may cause a vibration which deteriorates the image. Accordingly, it is difficult to obtain a high-speed and stable image reading.

Additionally, Japanese Patent Publication 7-193682 [6] discloses a reflection type image scanning apparatus, in which an optical mark is applied to a position corresponding to a manuscript scan range. Moreover, Japanese Patent Publication 8-9102 [7] discloses a scanner technique associated with an image scanner including an image read unit having an image formation device, an image read device, and an illumination device which are constituted as a unitary block. Furthermore, Japanese Patent Publication 10-336404 [8] discloses a reflection type image scanning apparatus in which a reference region is provided on a manuscript table so as to compensate a brightness change of the illumination light depending on a frequency of a fluorescent lamp provided on a ceiling or the like.

However, none of the aforementioned documents [6] [7], and [8] discloses an image reading mechanism in a stand type image scanning apparatus for scanning a slit-shaped light beam or a technique for detecting the brightness of the light beam reflection for controlling the light beam light quantity.

Among the indirect type image scanners, those not using an auxiliary illumination for the image input mechanism have a problem that the brightness on the manuscript surface is not sufficient, which relatively increases the noise level of the output of the image sensor, adversely affecting the image which has been read in, and those using an auxiliary illumination for illuminating the entire manuscript surface have a problem that eyes of a user are dazzled and the heat is unpleasant for the user.

SUMMARY OF THE INVENTION

It is therefore an object of the present invention to provide an image scanning apparatus and an image scanning method realized as an indirect type image scanner apparatus capable of a high-speed, high-quality image input without causing to dazzle eyes of a user while securing a necessary brightness.

The image scanning apparatus according to a first embodiment of the present invention comprises a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, and the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device.

The image scanning method according to a second embodiment of the present invention uses an image scanning apparatus comprising a support arm, a stand block supporting the support arm, a scan illumination device mounted on the support arm for applying a slit-shaped light beam onto a surface of a manuscript, and a manuscript image scanning device for inputting a manuscript image illuminated by the slit-shaped light beam and reflected from the manuscript surface; the method comprising steps of: applying the slit-shaped light beam from the scan type illumination device; causing the slit-shaped light beam to scan in a direction vertical to the longitudinal direction of the slit in the slit-shaped light beam; in the manuscript image input block, receiving a light reflected from the manuscript surface containing a manuscript image, and selectively applying the reflected light containing the manuscript image to a predetermined portion of the light receiving elements in the light detecting device provided in the image scanning device; and displacing the manuscript image input block in synchronization with the scan operation by the scan type illumination device.

DESCRIPTION OF THE PREFERRED EMBODIMENTS

Description will now be directed to an image scanning apparatus and an image scanning method according to embodiments of the present invention with reference to the attached drawings.

Figure 1:
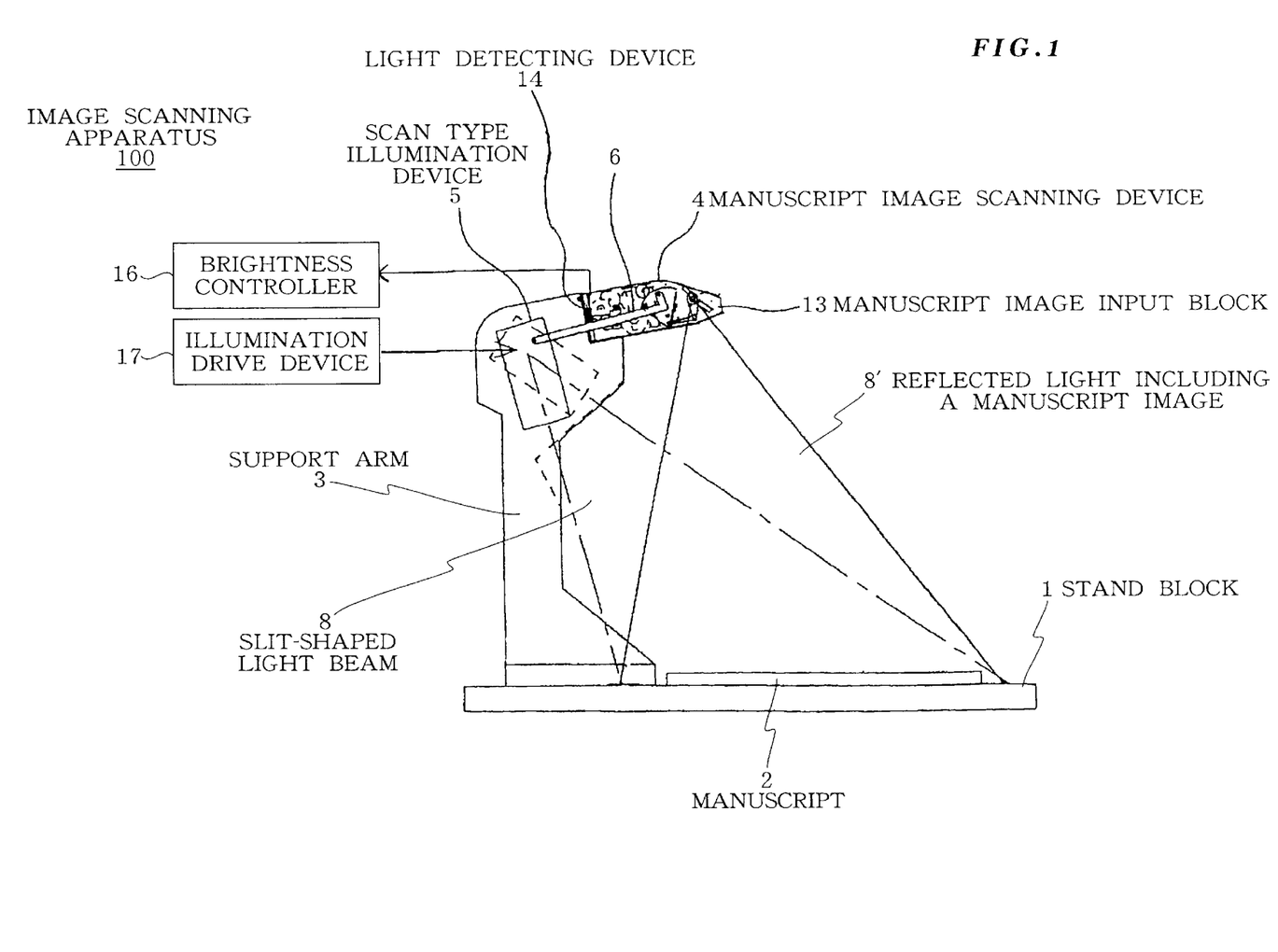
FIG. 1 is a side view of an image scanning apparatus according to the present invention.

FIG. 1 shows a configuration of an image scanning apparatus 100 according to the present invention. The image scanning apparatus 100 includes a support arm 3, a stand 1 supporting the support arm 3, a scan type illumination device 5 mounted on the support arm 3 for illuminating a slit-shaped light beam 8 onto a manuscript 2, and a manuscript image scanning device 4 for reading a manuscript image as a slit-shaped light beam 8 reflected from the surface of the manuscript 2.

It should be noted that a longitudinal direction 9 of the slit-shaped light beam 8 illuminated by the scan type illumination device 5 is assumed to a first direction 10 of the manuscript 2 while the direction vertical to the first direction is assumed to be a second direction 11 of the manuscript 2.

The aforementioned manuscript image scanning device 4 includes a manuscript image input block 13, a light detecting device 14, and a lens 15. The manuscript image input block 13 inputs a reflected light 8' containing the manuscript image reflected from the surface of the manuscript 2, so that a light which has been output from the manuscript image input block 13 is used to form an image by the lens 15 on the light receiving surface of the light detecting device 14.

The manuscript image input block 13 is formed so that the reflected light 8' containing a manuscript image reflected from the surface of the manuscript 2 selectively illuminates a predetermined portion of the light receiving element surface of the light detecting device 14 in synchronization with the scan operation of the scan type illumination device 5.

Figure 4:
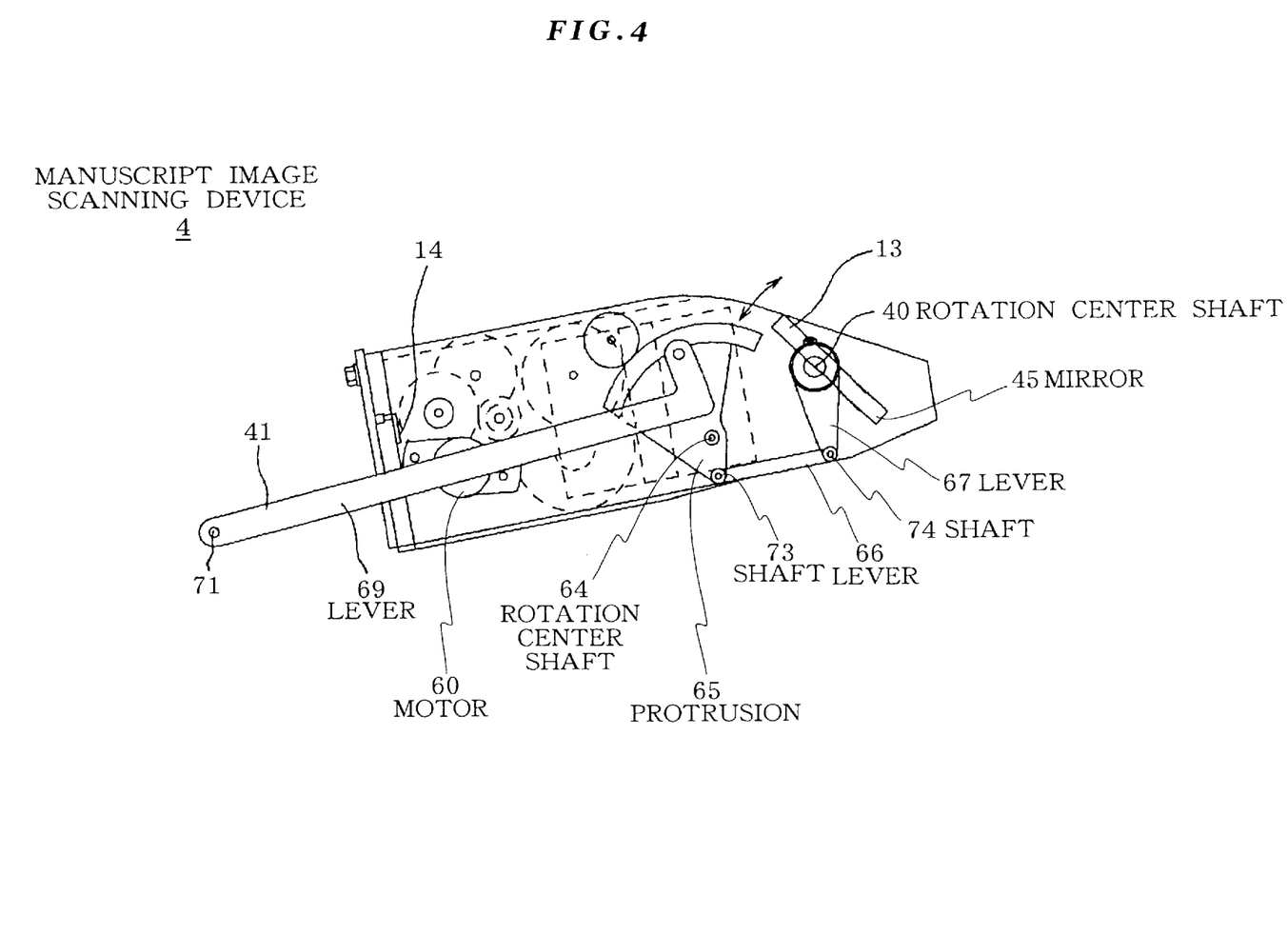
FIG. 4 is a side view of an image scan device used in the image scanning apparatus according to the present invention.

For example, as shown in FIG. 4, the manuscript image input block 13 is constituted by a mirror 45 rotatable around a predetermined rotation shaft 40 in synchronization with the scan operation of the scan type illumination device 5. The reflected light 8' containing a manuscript image reflected from the surface of the manuscript is output by the mirror 45 toward the light detecting device 14 constituted by a linear image sensor.

Figure 3:
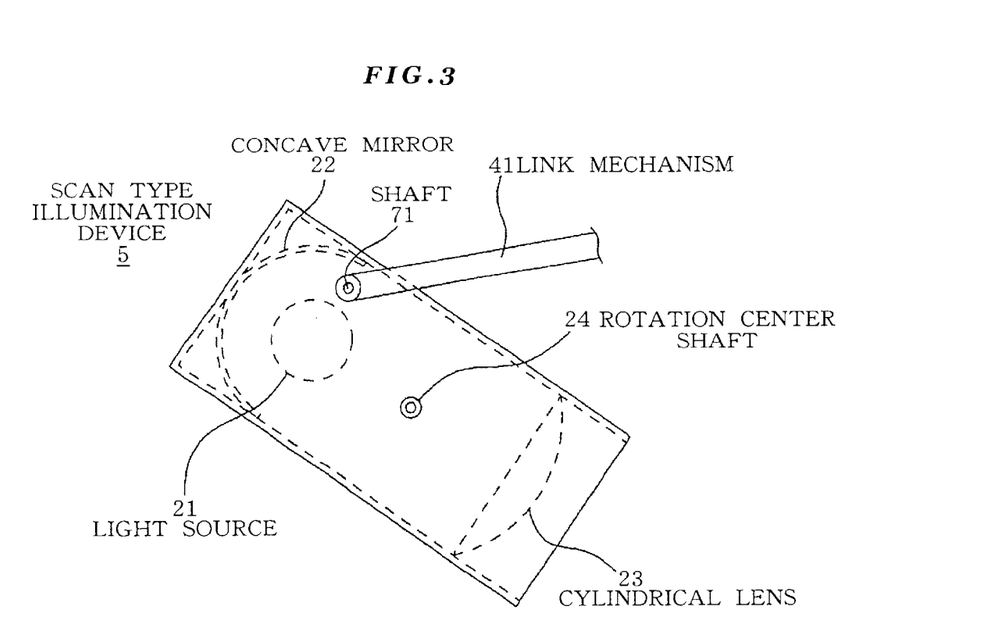
FIG. 3 is a side view of a scan type illumination device used in the image scanning apparatus according to the present invention.

As shown in FIG. 3, the scan type illumination device 5 includes a light source 21, a concave mirror 22, and a cylindrical lens 23. The scan type illumination device 5 is constituted to rotate around a predetermined shaft 24 in response to a link mechanism 41.

The light detecting device 14 used in the image scanning apparatus 100 according to the present invention is constituted basically by a photoelectric element such as a linear image sensor made of CCD. A plurality of the light detecting device 14 are arranged in a single or more than one rows in the aforementioned first direction.

Furthermore, in the image scanning apparatus 100 according to the present invention, the scan type illumination device 5 and the manuscript image input block 13 in the image scanning device 4 are connected to each other via the link mechanism 41 so as to be able to swing.

That is, in the image scanning apparatus 100 according to the present invention, by swinging the manuscript image input block 13 in the image scanning device 4 in synchronization with the scan operation of the scan type illumination device 5, the reflected light 8' containing a manuscript image reflected from the surface of the manuscript 2 is selectively input to a particular position of the light receiving elements constituting the light detecting device 14 in spite of the scan position of the slit-shaped light beam 8 which is output from the scan type illumination device 5. For example, the reflected light 8' is input to a center portion (viewed from the second direction 11) of the linear portion on the manuscript 2 illuminated by the scan type illumination device 5.

It should be noted that the scan type illumination device 5 according to the present invention is detachably attached to the support arm 3.

On the other hand, in the image scanning apparatus 100 according to the present invention, when the slit-shaped light beam 8 from the scan type illumination device 5 is reflected from the surface of the manuscript 2 and enters the manuscript image input block 13 of the image scanning device 4, the brightness of the reflected light 8' containing a manuscript image reflected from the surface of the manuscript 2 is normally changed in the second direction of the manuscript 2 which is the scan direction of the slit-shaped light beam 8.

That is, in the image scanning apparatus according to the present invention, the slit-shaped light beam 8 ejected from the scan type illumination device 5, depending on an illuminated position, changes its distance from the light source to the illuminated position on the manuscript surface and from the illuminated position to the image input block. As the distance becomes greater, the reflected light from the manuscript surface also reduces its brightness.

In an embodiment according to the present invention, a brightness controller 16 is provided for adjusting the brightness of the slit-shaped beam 8 so as to compensate the aforementioned brightness change and obtain a uniform brightness of the reflected light 8' containing the manuscript image.

Figure 2:
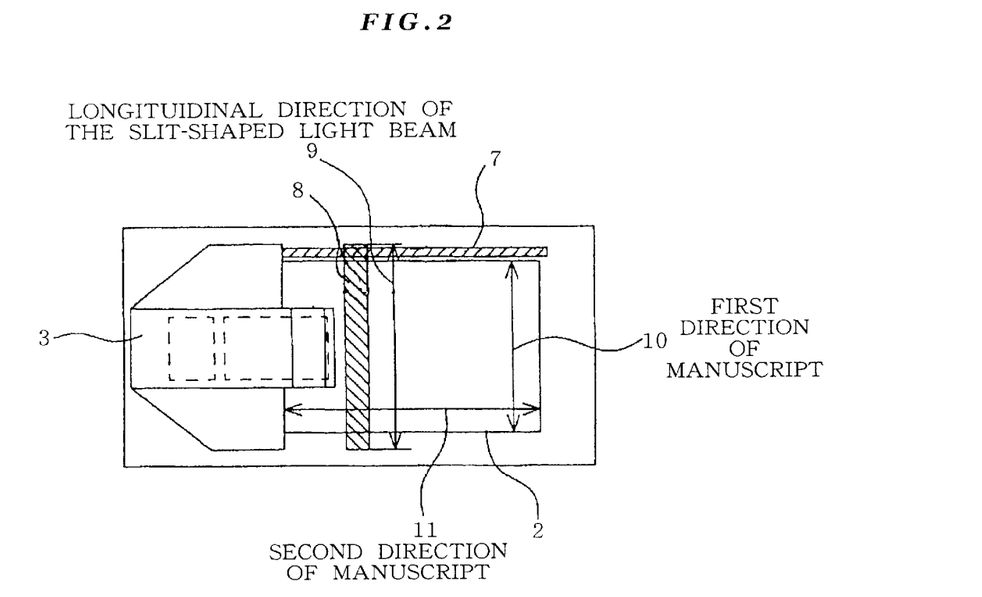
FIG. 2 is a plan view of an image scanning apparatus according to the present invention.

More specifically, for example, as shown in FIG. 2, a brightness detection area 7 is provided for the reflected light 8' of the slit-shaped light beam along the second direction 11 of the scan type illumination device 5 on a part of the stand block 1.

The brightness controller 16 detects a brightness change of the reflected light 8' containing the manuscript image by the slit-shaped light beam from the brightness detection area 7 and outputs an information required for adjusting the brightness, i.e., the light quantity of the slit-shaped light beam 8. In response to the output information from the brightness controller 16, an illumination drive device 17 controls the brightness of the slit-shaped light beam.

In the aforementioned specific example, the sensor for detecting the brightness change is one or more than one photoelectric conversion elements arranged at the end of the linear image sensor constituting the light detecting device 14. The brightness of the reflected light 8' in the brightness detection area 7 is detected and the detection data is transmitted to the brightness controller 16.

The one or more than one photoelectric conversion elements arranged at the end of the linear image sensor are successively fed with images and simultaneously with this, can detect the brightness of the reflected light 8' from the brightness detection area.

This detection data is compared to a predetermined reference brightness to obtain a difference value. To make the difference value 0, a compensation data is created and transmitted to the illumination drive device 17 for controlling the slit-shaped light beam 8. According to the compensation data, the illumination drive device 17 adjusts a light quantity to obtain a necessary brightness.

In this embodiment, as shown in FIG. 2, the brightness detection area 7 is arranged in the sub scan direction (the second direction) 11 on the stand block 1. The brightness detection area 7 has a flat surface having a predetermined brightness.

The brightness detection area 7 in this invention may be a part of the stand block itself or a reflection tape attached to the stand block.

Furthermore, the brightness detection area 7 may be a stepped portion of the stand block which will not be covered with a manuscript or the like.

Moreover, in another specific example, the brightness of the slit-shaped light beam 8 is changed according to a scan position along the second direction of the manuscript.

Instead of the brightness detection area 7 and the brightness controller 16, a control table 19 and an illumination drive device 17 are provided.

Figure 5:
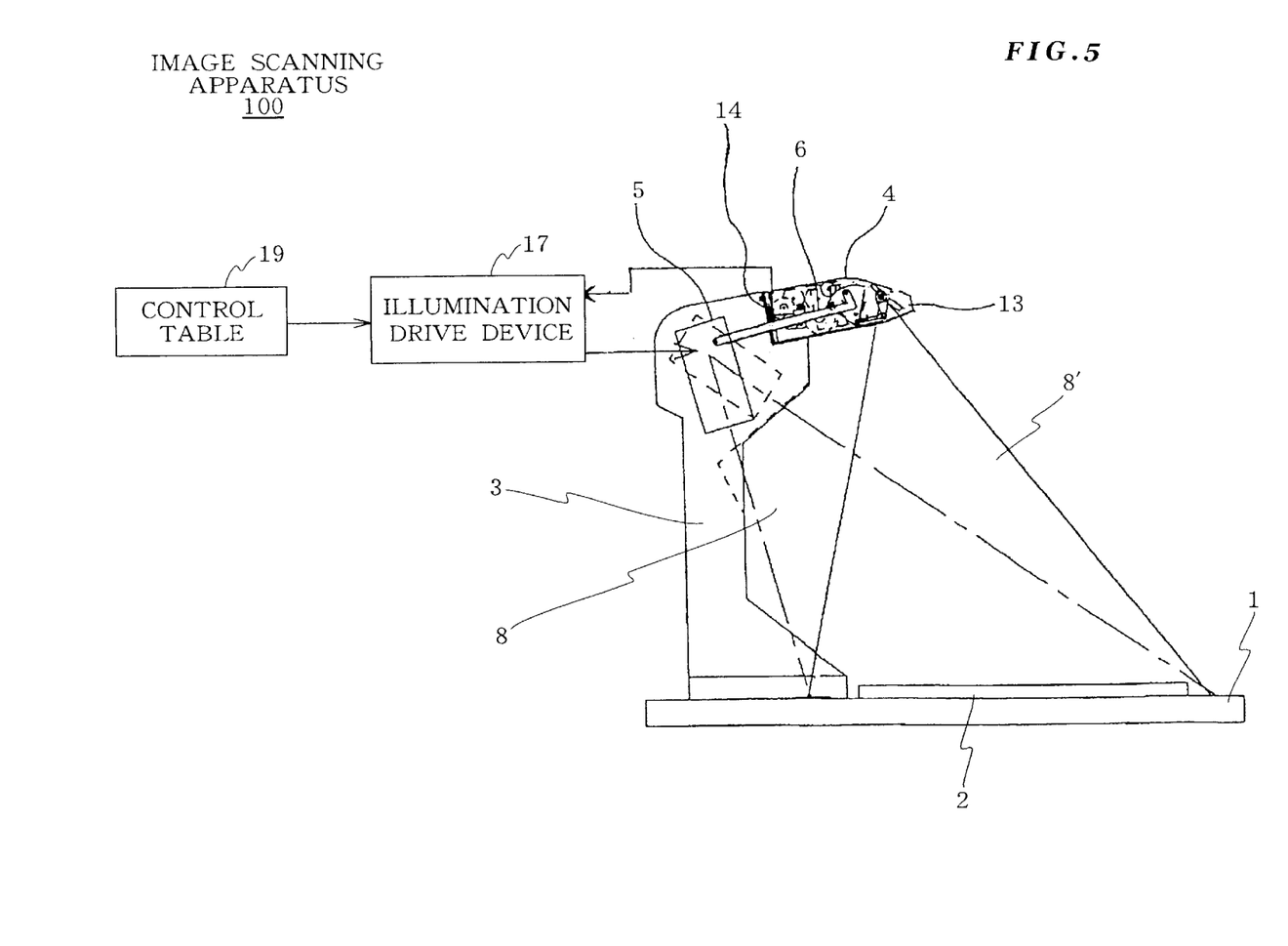
FIG. 5 is a side view of an image scanning apparatus according to another embodiment of the present invention.

The control table (look-up table) 19 is a list of correspondence between scan positions of the slit-shaped light beam 8 and the brightness of the light beam output from the illumination drive device. As shown in FIG. 5, the illumination drive device 17 controls a light quantity of the slit-shaped light beam 8 while referencing the control table 19 according to the scan position of the slit-shaped light beam 8.

In the image scanning apparatus 100 according to the present invention, the scan type illumination device 5 includes a light source 21 for performing photoelectric conversion, a cylindrical lens 23 functioning as a converging mechanism for converging the light from the light source 21 into a slit-shaped light beam, and a concave mirror. The converging mechanism 23 and the light source 21 can be attached and detached as a unitary block to/from the image scanning apparatus 100.

The image scanning apparatus according to the present invention synchronizes rotation of a mirror rotation mechanism 13 of the image scanning device 4 with rotation of the scan type illumination device 5 using the link mechanism 41, so that the illumination range of the slit-shaped light beam 8 is synchronized with the sub scan portion on the manuscript 2 from which an image is formed on the linear image sensor.

Next, explanation will be given on a specific example of the link mechanism as a mechanism performing the aforementioned synchronization with reference to the attached drawings.

Figure 6:
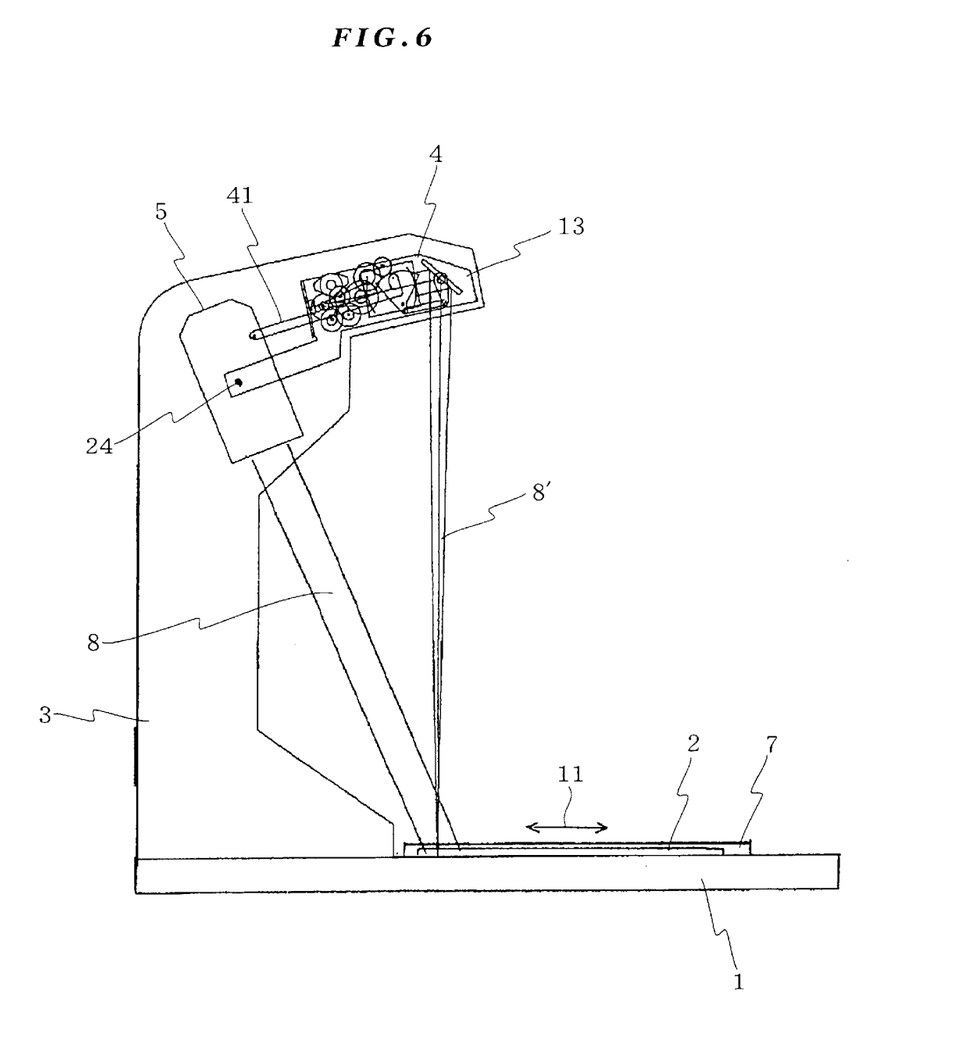
FIG. 6 shows an outline of a link mechanism in the image scanning apparatus according to the present invention.
Figure 7:
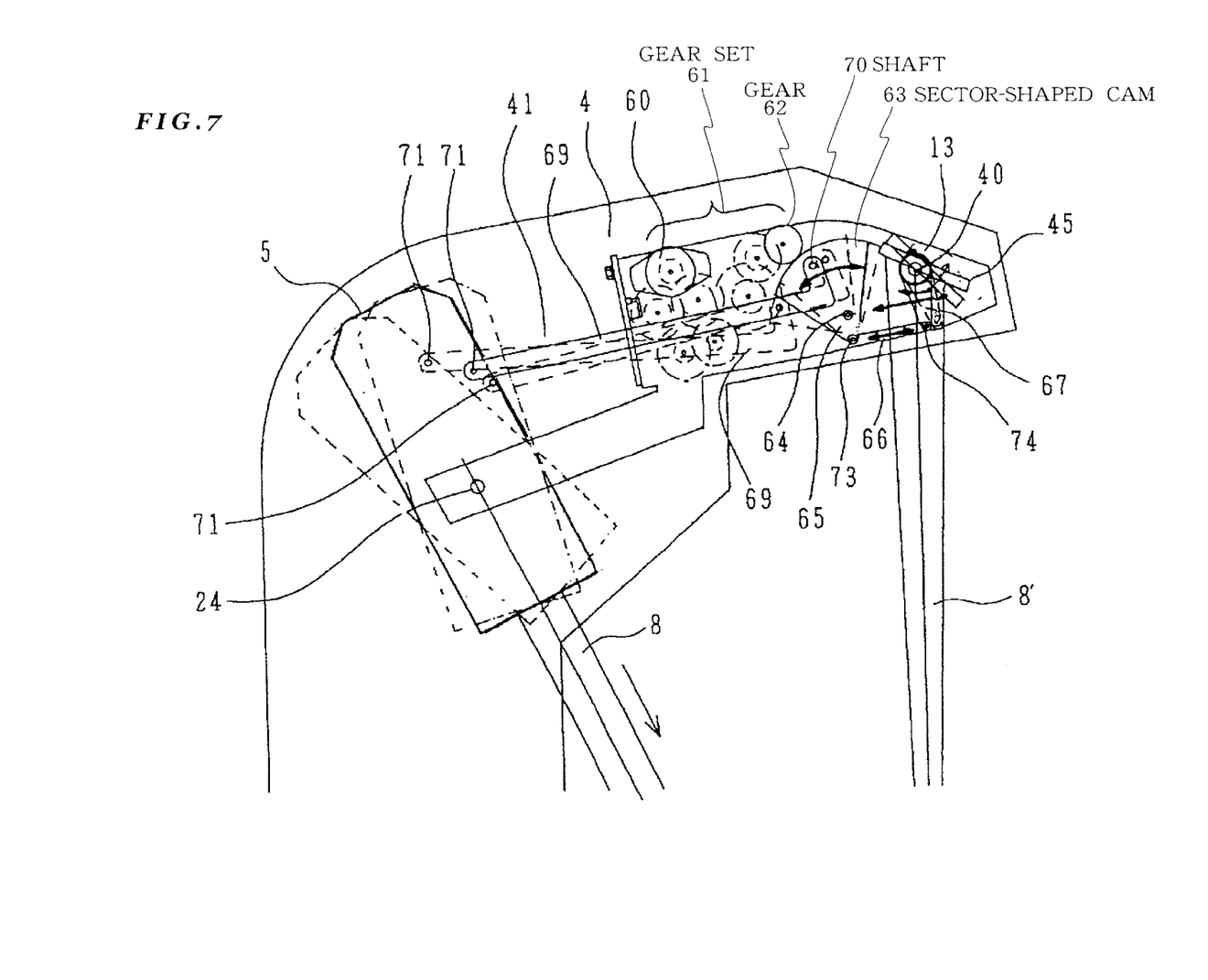
FIG. 7 is a detailed view of the link mechanism in the image scanning apparatus according to the present invention.

FIG. 6 briefly explains the link mechanism 41 for synchronizing the scan type illumination device 5 used in the image scanning apparatus 100 according to the present invention with the manuscript image input block 13 in the image scanning device 4. FIG. 7 shows a detailed configuration of the link mechanism 41.

Firstly, in FIG. 7, a motor 60 rotates a gear 62 engaged with a sector-shaped cam 63 via a gear set 61. Then, the sector-shaped cam 63 is rotated around a rotation shaft 64 so as to move a lever 66 from right to left and from left to right. The lever 66 is rotatably connected via a rotary shaft 73 to a protrusion 65 extending from the rotation shaft 64 of the sector-shaped cam 63. As a result, a lever 67 supported by the lever 66 is rotated around the rotation shaft 40.

Thus, the manuscript image input block 13 connected to the rotation shaft 40 rotates the mirror 45 by a predetermined angle.

On the other hand, an L-shaped cam lever 69 has one end engaged with a part of the scan type illumination device via a rotation shaft 71 and the other end rotatably engaged with the sector-shaped cam 63 via a shaft 70.

When the sector-shaped cam 63 is rotated, the L-shaped cam lever 69 is displaced from right to left or from left to right, which in turn displaces the scan type illumination device 5 which is rotatably engaged with one end of the L-shaped cam lever 69. As a result, the scan type illumination device 5 is rotated around the rotation shaft 24.

In the gear set, dimensional specifications of the sector-shaped cam 63, the cam lever 69, the levers 66, 67 and the distance between the rotation shafts 70 and 64, between 64 and 73, and between 71 and 24 should be selected so that the reflected light 8' of the slit-shaped light beam 8 can be input in such a manner that the center portion in the second direction of the bright linear portion on the manuscript illuminated by the scan type illumination device is always matched with the center portion in the sub scan direction of the light receiving element surface.

Hereinafter, explanation will be given on an example of the present invention.

The image scanning method according to the present invention uses an image scanning apparatus including a support arm, a stand block supporting the support arm, a scan type illumination device mounted on the support arm for ejecting a slit-shaped light beam onto a surface of a manuscript, and a manuscript image scanning device for reading a manuscript image reflected from the manuscript surface by the slit-shaped light beam. The image scanning method includes: a step of ejecting a slit-shaped light beam from the scan type illumination device, a step of scanning with the slit-shaped light beam in a direction vertical to the longitudinal direction of the slit-shaped light beam on a manuscript, a step of receiving a reflected light containing a manuscript image reflected from the surface of the manuscript by the manuscript image input block for selectively applying the light to a predetermined part of the light receiving element surface in the light detecting device arranged in the image scanning device, and a step of displacing the manuscript image input block in synchronization with the scan operation of the scan type illumination device.

In the image scanning method according to the present invention, the scan type illumination device 5 includes a light source 21, a concave mirror 22, and a cylindrical lens 23. The scan type illumination device 5 can be rotated as a unitary block around a predetermined shaft 24. The manuscript image input block 13 in the manuscript image scanning device 4 is constituted by a mirror 45 for outputting to the light detecting device 14 the reflected light 8' containing a manuscript image reflected from the surface of the manuscript 2. The mirror 45 is rotated around the predetermined shaft 40 in synchronization with the scan operation of the scan type illumination device 5.

Moreover, in the image scanning method according to the present invention, the scan type illumination device 5 and the manuscript image input block 13 in the manuscript image scanning device 4 swing as a unitary block via the link mechanism 41.

On the other hand, in the present invention, there is a step for changing the brightness of the slit-shaped light beam 8 output from the scan type illumination device 5 according to a scan position along the second direction of the slit-shaped light beam 8.

That is, a control table is created to define the relationship between the brightness of the slit-shaped light beam 8 and the scan position of the slit-shaped light beam 8. According to this control table, the brightness in the scan type illumination device 5 is adjusted by the illumination drive device 17 of the light source 21.

Furthermore, in the image scanning method according to the present invention, the brightness detection area 7 is provided along the second direction 11 on the manuscript plane for detecting the brightness of the slit-shaped light beam 8. The detected information from the brightness detection area 7 is input to the brightness adjustment device 16. According to the output information from the brightness adjustment device 16, the illumination drive device 17 is controlled so as to adjust the brightness of the light source in the scan type illumination device 5.

The image scanning apparatus and the image scanning method according to the present invention having the aforementioned configuration, in comparison to the type illuminating the entire manuscript surface, enable to perform scanning without dazzling eyes of a user while maintaining a necessary brightness on the necessary portion. For this, it is possible to obtain a signal of a necessary level in a short time from the image sensor. The present invention provides an image scanning apparatus and an image scanning method enabling in an indirect type image scanner apparatus to perform a high-speed high-quality image input.

The invention may be embodied in other specific forms without departing from the spirit or essential characteristic thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 11-197788 (Filed on Jul. $12^{th}$, 1999) including specification, claims, drawings and summary are incorporated herein by reference in its entirety.

What is claimed is:

1. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, and the scan type illumination device includes a light source, a concave mirror, and a cylindrical lens which are constructed so as to be rotatable around a predetermined shaft.

2. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, and the manuscript image input block in the image scanning device includes a mirror for directing to the light detecting device the reflected light containing the manuscript image reflected from the manuscript surface, the mirror being constructed so as to be rotatable around a predetermined shaft in synchronization with the scan operation of the scan type illumination device.

3. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, and the reflected light containing a manuscript image which is output from the manuscript image input block toward the light detecting device is selectively input to a predetermined position of the light receiving elements where an image of a center portion is formed among the linear portions on the manuscript illuminated by the scan type illumination device when viewed in a direction vertical to the longitudinal direction of the slit of the slit-shaped light beam.

4. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, and the scan type illumination device and the manuscript image input block in the image scanning device are interlocked with each other via a link mechanism so as to swing together.

5. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, and the scan type illumination device is detachably attached to the support arm.

6. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, the apparatus further comprising a brightness adjustment device for changing brightness of the slit-shaped light beam which is output from the scan type illumination device, according to the scan position along a direction vertical to the longitudinal direction of the slit in the slit-shaped light beam.

7. An image scanning apparatus as claimed in claim 6, wherein the brightness adjustment device has a brightness control table.

8. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, and a brightness detection area is provided on a part of the stand block along a direction vertical to the longitudinal direction of the slit in the slit-shaped light beam of the scan type illumination device, and a brightness adjustment device is provided for adjusting brightness of the slit-shaped light beam produced from the scan type illumination device, according to a detected information on the light quantity reflected from the brightness detection area.

9. An image scanning apparatus as claimed in claim 8, wherein the brightness information of the slit-shaped light beam from the brightness detection area is detected by some of the light receiving elements constituting the light detecting device.

10. An image scanning method using an image scanning apparatus comprising: a support arm, a stand block supporting the support arm, a scan illumination device mounted on the support arm for applying a slit-shaped light beam onto a surface of a manuscript, and a manuscript image scanning device for inputting a manuscript image illuminated by the slit-shaped light beam and reflected from the manuscript surface, the method comprising steps of:

applying the slit-shaped light beam from the scan type illumination device in the longitudinal direction of the slit in the slit-shaped light beam, causing the slit-shaped light beam to scan in a direction vertical to the longitudinal direction of the slit in the slit-shaped light beam, in the manuscript image input block, receiving a light reflected from the manuscript surface containing a manuscript image, and selectively applying the reflected light containing the manuscript image to a predetermined portion of the light receiving elements in the light detecting device provided in the image scanning device, and displacing the manuscript image input block in synchronization with the scan operation by the scan type illumination device, the method further comprising a step of rotating at least a light source, a concave mirror, and a cylindrical lens constituting the scan type illumination device around a predetermined shaft during a scan operation of the scan type illumination device.

11. An image scanning method using an image scanning apparatus comprising: a support arm, a stand block supporting the support arm, a scan illumination device mounted on the support arm for applying a slit-shaped light beam onto a surface of a manuscript, and a manuscript image scanning device for inputting a manuscript image illuminated by the slit-shaped light beam and reflected from the manuscript surface, the method comprising steps of:

applying the slit-shaped light beam from the scan type illumination device in the longitudinal direction of the slit in the slit-shaped light beam, causing the slit-shaped light beam to scan in a direction vertical to the longitudinal direction of the slit in the slit-shaped light beam, in the manuscript image input block, receiving a light reflected from the manuscript surface containing a manuscript image, and selectively applying the reflected light containing the manuscript image to a predetermined portion of the light receiving elements in the light detecting device provided in the image scanning device, and displacing the manuscript image input block in synchronization with the scan operation by the scan type illumination device, wherein the manuscript image input block in the manuscript scanning device has a mirror block for applying the reflected light from the manuscript surface containing the manuscript image to the light detecting device and the method further comprises a step of rotating the mirror block around a predetermined shaft in synchronization with the scan operation of the scan type illumination device.

12. An image scanning method as claimed in claim 11, wherein the light detecting device is formed by one or more than one row of photoelectric conversion elements.

13. An image scanning method using an image scanning apparatus comprising: a support arm, a stand block supporting the support arm, a scan illumination device mounted on the support arm for applying a slit-shaped light beam onto a surface of a manuscript, and a manuscript image scanning device for inputting a manuscript image illuminated by the slit-shaped light beam and reflected from the manuscript surface, the method comprising steps of:

applying the slit-shaped light beam from the scan type illumination device in the longitudinal direction of the slit in the slit-shaped light beam, causing the slit-shaped light beam to scan in a direction vertical to the longitudinal direction of the slit in the slit-shaped light beam, in the manuscript image input block, receiving a light reflected from the manuscript surface containing a manuscript image, and selectively applying the reflected light containing the manuscript image to a predetermined portion of the light receiving elements in the light detecting device provided in the image scanning device, and displacing the manuscript image input block in synchronization with the scan operation by the scan type illumination device, wherein the scan type illumination device and the manuscript image input block in the manuscript image scanning device are interlocked with each other via a link mechanism so as to swing together.

14. An image scanning method using an image scanning apparatus comprising: a support arm, a stand block supporting the support arm, a scan illumination device mounted on the support arm for applying a slit-shaped light beam onto a surface of a manuscript, and a manuscript image scanning device for inputting a manuscript image illuminated by the slit-shaped light beam and reflected from the manuscript surface, the method comprising steps of:

applying the slit-shaped light beam from the scan type illumination device in the longitudinal direction of the slit in the slit-shaped light beam, causing the slit-shaped light beam to scan in a direction vertical to the longitudinal direction of the slit in the slit-shaped light beam, in the manuscript image input block, receiving a light reflected from the manuscript surface containing a manuscript image, and selectively applying the reflected light containing the manuscript image to a predetermined portion of the light receiving elements in the light detecting device provided in the image scanning device, and displacing the manuscript image input block in synchronization with the scan operation by the scan type illumination device, the method further comprising a step of changing the brightness of the slit-shaped light beam output from the scan type illumination device according to the scan position along a direction vertical to the longitudinal direction of the slit in the slit-shaped light beam.

15. An image scanning method using an image scanning apparatus comprising: a support arm, a stand block supporting the support arm, a scan illumination device mounted on the support arm for applying a slit-shaped light beam onto a surface of a manuscript, and a manuscript image scanning device for inputting a manuscript image illuminated by the slit-shaped light beam and reflected from the manuscript surface, the method comprising steps of:

applying the slit-shaped light beam from the scan type illumination device in the longitudinal direction of the slit in the slit-shaped light beam, causing the slit-shaped light beam to scan in a direction vertical to the longitudinal direction of the slit in the slit-shaped light beam, in the manuscript image input block, receiving a light reflected from the manuscript surface containing a manuscript image, and selectively applying the reflected light containing the manuscript image to a predetermined portion of the light receiving elements in the light detecting device provided in the image scanning device, and displacing the manuscript image input block in synchronization with the scan operation by the scan type illumination device, wherein the image scanning apparatus further comprises: a brightness detection area arranged on a part of the stand block along a direction vertical to the longitudinal direction of the slit in the slit-shaped light beam for detecting the brightness of the slit-shaped light beam; and a brightness adjustment device for adjusting the slit-shaped light beam output from the scan type illumination device according to a detected information on the light quantity reflected from the brightness detection area.

16. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, said scan type illumination device is cylindrically shaped and comprises a concave mirror and a cylindrical lens provided at opposing axial ends, and a light source provided between said concave mirror and said cylindrical lens; and said scan type illumination device is rotatable around a predetermined shaft orthogonal to its axial direction.

17. An image scanning apparatus as claimed in claim 16, said apparatus further comprising a brightness adjustment device, wherein said brightness adjustment device changes a brightness of said slit-shaped light beam output from said scan type illumination device based upon a angular position of said scan type illumination device when it is rotated around said predetermined shaft orthogonal to said axial direction of said scan type illumination device.

18. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, and said scan type illumination device and said manuscript image input block are interlocked with each other via a link mechanism so as to swing in the same direction simultaneously through arcs that are substantially parallel to each other.

19. An image scanning apparatus as claimed in claim 18, wherein the stand block is a table for placing a manuscript.

20. An image scanning apparatus as claimed in claim 18, wherein the longitudinal direction of a slit in the slit-shaped light beam is a linear direction which is scanned by the light detecting device.

21. An image scanning apparatus as claimed in claim 18, wherein the light detecting device includes one or more than one row of photoelectric conversion elements.

22. An image scanning apparatus comprising: a support arm, a stand block supporting the support arm, a scan type illumination device mounted on the support arm for applying a slit-shaped light beam onto a surface of a manuscript, and a manuscript image scanning device for scanning a manuscript image illuminated by the slit-shaped light beam and reflected from the surface of the manuscript, wherein the scan type illumination device is constructed so as to apply the slit-shaped light beam in a direction vertical to the longitudinal direction of the slit shape of the slit-shaped light beam, the image scanning device includes a manuscript image input block for inputting a reflected light containing a manuscript image reflected from the surface of the manuscript and a light detecting device supplied with the reflected light containing the manuscript image which is output from the manuscript image input block, the manuscript image input block is constructed in such a manner that the reflected light containing the manuscript image reflected from the manuscript surface is selectively applied to a predetermined portion of the light receiving surface in the light detecting device in synchronization with the scan operation of the scan type illumination device, said apparatus further comprising a brightness adjustment device, wherein said brightness adjustment device changes a brightness of said slit-shaped light beam output from said scan type illumination device based upon a vertical position of said slit-shaped light beam on said surface of said manuscript, so that said brightness grows larger as said slit-shaped light beam's position on said manuscript is moved farther away from said scan type illumination device.

* * * * *